(No Model.)
P. B. WILSON.
Amalgamator.
No. 231,878. Patented Aug. 31, 1880.
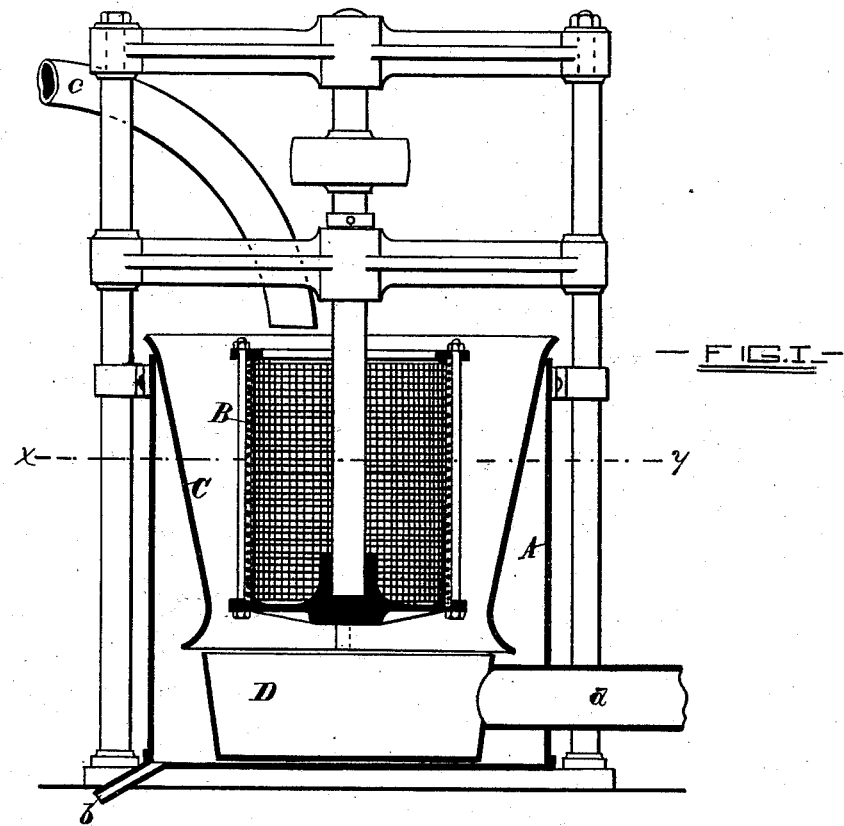
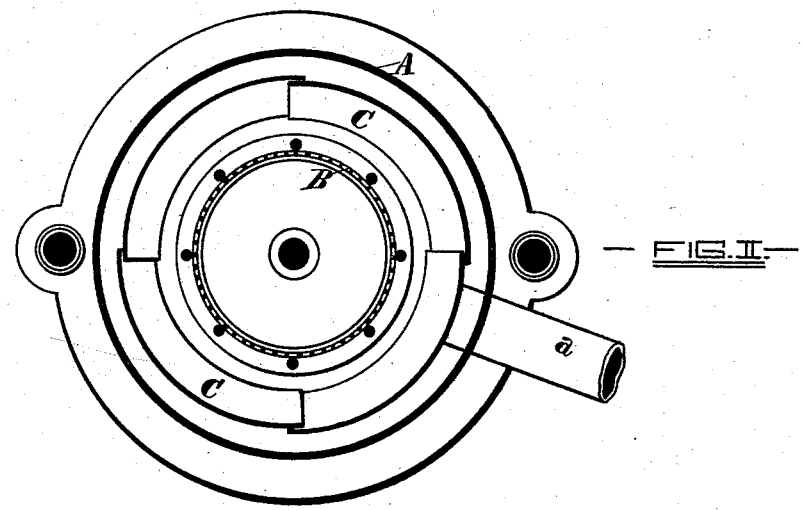

UNITED STATES PATENT OFFICE.

PIERCE B. WILSON, OF BALTIMORE, MARYLAND.

AMALGAMATOR.

SPECIFICATION forming part of Letters Patent No. 231,878, dated August 31, 1880.

Application filed May 10, 1880. (No model.)

*To all whom it may concern:*

Be it known that I, PIERCE B. WILSON, of the city of Baltimore and State of Maryland, have invented an Improved Amalgamator, of which the following is a specification; and I do hereby declare that in the same is contained a full, clear, and exact description of my said invention, reference being had to the accompanying drawings, and to the letters of reference marked thereon.

This invention relates to the adaptation of a centrifugal machine to the separation of the precious metals from water, sand, and crushed ores; and it, briefly stated, consists in the interposition between the basket and outer casing of the said machine of an amalgamated plate adapted to receive the contents of the revoluble basket as the same are thrown off by centrifugal force.

In the further description of my said invention, which follows, reference is made to the accompanying drawings, forming a part hereof, and in which—

Figure 1 is a vertical section of my improved apparatus. Fig. 2 is a cross-section of the same on the dotted line *x y.*

Similar letters of reference indicate similar parts in both the views.

A is the outer casing of the centrifugal machine, and B the revoluble basket, which is driven in the usual way. C is the amalgamated plate, preferably made in sections, which is placed in the casing A and around the basket B. The lower edge of the plate C extends below the basket B, and it is preferably flared outwardly, for a purpose hereinafter described.

D is a pan located at the bottom of the casing A, into which the refuse material falls, and it is furnished with an outlet-pipe, *a*. The casing A is provided with a delivery-pipe, *b*, for the amalgam.

The water, or the water, sand, and reduced ore, are introduced into the revoluble basket by means of a trough or pipe, *c*, and projected from the basket by centrifugal force against the amalgamated plate C, which retains the gold, the refuse material falling to the pan D. By flaring the lower edge of the plate C the amalgam is conducted past the edge of the pan D to the bottom of the casing.

I claim as my invention—

In combination with a centrifugal machine, an amalgamated plate interposed between the revoluble basket and the outer casing of the machine, substantially as and for the purpose herein specified.

PIERCE B. WILSON.

Witnesses:
HARRY V. ALBAUGH,
WM. T. HOWARD.